F. SEYMOUR.
COMPOUND SPINDLE.
APPLICATION FILED MAY 16, 1908.
936,672.
Patented Oct. 12, 1909.
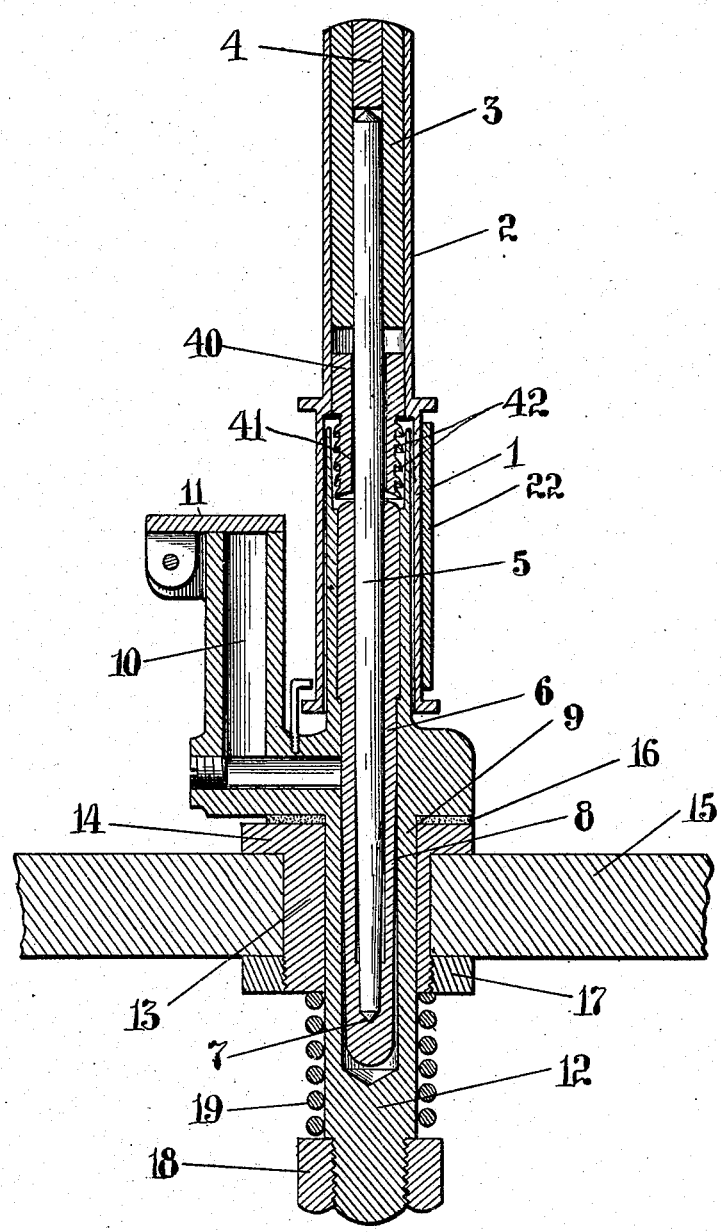

UNITED STATES PATENT OFFICE.

FRANCIS SEYMOUR, OF PATERSON, NEW JERSEY, ASSIGNOR TO MODERN SILK COMPANY, OF PATERSON, NEW JERSEY, A CORPORATION OF NEW JERSEY.

COMPOUND SPINDLE.

936,672.      Specification of Letters Patent.      Patented Oct. 12, 1909.

Application filed May 16, 1908. Serial No. 433,201.

*To all whom it may concern:*

Be it known that I, FRANCIS SEYMOUR, a citizen of the United States, and resident of Paterson, in the county of Passaic and State of New Jersey, have invented certain new and useful Improvements in Compound Spindles, of which the following is a specification.

The object of my invention is to provide a new and improved driven compound spindle which is composed of few parts, is simple in construction, perfectly lubricated and in which the friction is reduced to a minimum thus permitting of running it at exceptionally high speed and which spindle is practically devoid of vibration and can be adjusted easily and readily.

In the accompanying drawings, in which like numerals of reference indicate like parts, the figure is a vertical sectional view of my improved compound spindle.

The whirl 1 is made integral with the tubular spool holder 2 which has a wooden lining 3 and wooden bearing plug 4 secured in the top. A spindle blade 5 rests loosely in the bolster or sleeve 6 provided at its closed bottom end with a bearing 7 for the lower end of the spindle blade, and this sleeve or bolster 6 is inserted into a vertical tubular socket 8 formed on the spindle holder 9, this socket being surrounded by the whirl 1. A sleeve 40 preferably made of bronze is forced into the tubular spool holder and terminates at its lower part in a neck 41 from which a series of superimposed downwardly curved annular ribs 42 project which prevent the oil from being thrown upward by the rapid rotary motion. An oil cup 10 having a cover 11 is formed on the holder 9. The holder is provided with a downwardly extending stem 12 which passes through an eccentric bushing 13 provided at its upper end with a flange resting upon the rail 15 through which the bushing passes. A washer 16 of yielding material, such as felt, rubber or leather is placed between the flange 14, upon which it rests and the bottom of the holder 9 which in turn rests upon this washer. A nut 17 is screwed on the lower externally threaded end of the bushing 13 for the purpose of holding the bushing securely in place in the rail. A nut 18 is screwed on the lower end of the stem 12 and a helical spring 19 surrounds the stem between the upper surface of said nut and the bottom edge of the bushing thus exerting a downward pressure on the stem and on the holder 9 and pressing the bottom of this holder upon the washer 16. The whirl and spool holder turn or rotate on the spindle blade and the latter turns or rotates in the bolster or sleeve. A driving belt 22 is in frictional contact with the whirl.

For the reason that the whirl and spool holder are mounted to turn on the spindle and the latter is mounted to turn or rotate in the bolster or sleeve this spindle can be rotated at an excessively high speed, but at such excessive high speed there would be a tendency of vibration which would be injurious in its effect on the operation being performed and on the article produced by the operation. Such vibration is absorbed or taken up by the spring 19 but still there is a possibility of a minute movement between the bushing and the underside of the holder which might produce slight shocks, and although these slight shocks would be extremely minute, still they and the effects that they might have on the wear of the spindle, must be eliminated and this is accomplished by introducing the yielding washer, 16 between the bushing and the holder. In order to abtain the proper frictional contact between the whirl and the belt 22, provision has been made for moving the entire spindle toward or from the belt without detaching any parts from the supporting rail and for this purpose the nut 17 is loosened and the eccentric bushing 13 is turned axially whereby the entire spindle is moved slightly toward or from the belt and after the desired adjustments are made the parts are locked into position by tightening the nut 17.

Having described my invention what I claim as new and desire to secure by Letters Patent is:—

The combination with a spindle support, of a spindle blade, the lower end of said spindle blade being mounted revolubly within the spindle support, a combined spool holder and whirl mounted revolubly on the upper end of said revoluble spindle blade, a
5 sleeve surrounding the spindle blade and fitted within the hollow spool holder and provided with a downwardly projecting neck, said neck being provided with a series of superimposed downwardly inclined annular ribs, substantially as set forth.

Signed this 11th day of May A. D. 1908.

FRANCIS SEYMOUR.

Witnesses:
K. G. LE ARD,
OSCAR F. GUNZ.